(12) United States Patent
Kim et al.

(10) Patent No.: US 8,263,262 B2
(45) Date of Patent: Sep. 11, 2012

(54) ANODE FOR A LITHIUM RECHARGEABLE BATTERY AND LITHIUM RECHARGEABLE BATTERY USING THE SAME

(75) Inventors: Bongchull Kim, Yongin-si (KR); Jaehou Nah, Yongin-si (KR); Jangho Lee, Yongin-si (KR); Dongwoo Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 967 days.

(21) Appl. No.: 12/255,139

(22) Filed: Oct. 21, 2008

(65) Prior Publication Data

US 2009/0104535 A1    Apr. 23, 2009

(30) Foreign Application Priority Data

Oct. 23, 2007    (KR) .................. 10-2007-0106595

(51) Int. Cl.
*H01M 4/583* (2010.01)
*H01M 4/587* (2010.01)
(52) U.S. Cl. .................................. 429/231.8
(58) Field of Classification Search .................. None
See application file for complete search history.

(56) References Cited

U.S. PATENT DOCUMENTS

| | | | | |
|---|---|---|---|---|
| 7,947,394 B2 * | 5/2011 | Takei et al. | ................. | 429/231.8 |
| 8,003,257 B2 * | 8/2011 | Takeuchi et al. | ........... | 429/231.8 |
| 2002/0061445 A1 * | 5/2002 | Kitagawa et al. | .......... | 429/231.8 |
| 2005/0158550 A1 * | 7/2005 | Ohta et al. | ................... | 428/407 |
| 2006/0172201 A1 * | 8/2006 | Yasukawa et al. | ............. | 429/329 |
| 2007/0154812 A1 * | 7/2007 | Moriguchi et al. | ......... | 429/231.8 |
| 2008/0076032 A1 * | 3/2008 | Wakita et al. | ................. | 429/342 |
| 2009/0117473 A1 * | 5/2009 | Satoh et al. | .................... | 429/332 |
| 2009/0269669 A1 * | 10/2009 | Kim et al. | .................. | 429/231.8 |

FOREIGN PATENT DOCUMENTS

| | | |
|---|---|---|
| KR | 2004-0040473 A | 5/2004 |
| KR | 10-2007-0102881 | 10/2007 |
| KR | 10-0826890 | 4/2008 |
| KR | 10-0830612 | 5/2008 |

OTHER PUBLICATIONS

English-language abstract of KR 10-2007-0026786.
English-language abstract of KR 10-2007-0113066.

* cited by examiner

*Primary Examiner* — Robert Hodge
(74) *Attorney, Agent, or Firm* — Knobbe, Martens, Olson & Bear LLP

(57) ABSTRACT

An anode for a lithium rechargeable battery includes an active material layer that includes a metal-carbon composite active material including a carbonaceous active material and at least one active material selected from the group consisting of a metal or a metal oxide, graphite particles having surfaces that are coated or partially coated with a resin f, and a binder that binds and fixes the active material particles and the graphite particles to each other. The anode further includes a collector on which the active material layer is disposed. The resin-coated graphite particles maintain multiple conductive contact surfaces between the active material particles due to adhesiveness of the resin even when the volume of the metal-carbon composite active material particles is changed during charging and discharging, and prevent a reduction of the battery capacity and improve the lifetime of the battery.

12 Claims, No Drawings

ANODE FOR A LITHIUM RECHARGEABLE BATTERY AND LITHIUM RECHARGEABLE BATTERY USING THE SAME

CROSS-REFERENCE TO RELATED APPLICATIONS

This application claims the benefit of Korean Patent Application No. 2007-106595, filed Oct. 23, 2007, in the Korean Intellectual Property Office, the disclosure of which is incorporated herein by reference.

BACKGROUND OF THE INVENTION

1. Field of the Invention

Aspects of the present invention relates to an anode for a lithium rechargeable battery and a lithium rechargeable battery using the same, and more particularly, to an anode for a lithium rechargeable battery that uses a composite material containing metal, or non-metal, oxides thereof and carbonaceous material as an anode active material, and a lithium rechargeable battery using the same.

2. Description of the Related Art

Generally, as slimmed and lightweight portable electronic devices such as portable digital assistants (PDAs), cellular phones, notebook computers, digital cameras and others have been developed and widely used, batteries suitably used as a power supply of the portable electronic devices have been developed. Particularly, a lithium secondary battery is widely used in the electronic appliance field because the lithium secondary battery has a low self discharge rate and a high energy density per unit weight in comparison with other rechargeable batteries such as conventional lead batteries and nickel-cadmium batteries.

Lithium metal, which has a very high energy density, has been conventionally proposed as an anode active material of the lithium rechargeable battery. However, the use of lithium metal in a battery presents a safety problem in that dendrites are formed in the anode at charging, which can cause an internal short by penetrating into a separator. Moreover, the dendrites have a high reactivity because of a very large specific surface area, and react with the electrolyte of the battery, thereby forming a polymer film having low electron conductivity on the surface of the anode. Accordingly, the resistance of the battery is rapidly increased, or particles isolated from electron conduction network are generated, thereby interrupting charge/discharge.

Accordingly, graphite capable of absorbing and discharging lithium ions has been used as the anode active material instead of lithium metal. When graphite is used as the anode active material, the lithium metal is not deposited and dendrites are not formed. However, when the lithium metal is used for the anode, the theoretical discharge capacity is 3860 mAh/g, but when graphite is used for the anode, the theoretical discharge capacity is no more than 372 mAh/g. Accordingly, it would be desirable to have a new active material having a capacity higher than graphite.

Recently, materials forming compounds with lithium, that is, metals such as Sn, Al and Zn, non-metals such as Si, Ge, B and P, or oxides thereof have been proposed as the anode active material. An anode active material formed of one or more of these metals, non-metals or oxides thereof theoretically has a higher capacity than graphite, and accordingly, has a high initial capacity. However, there is a disadvantage that the capacity decreases rapidly after multiple charge/discharge cycles because the electrochemical reversibility of these materials is low. This disadvantage causes a reduction of the lifetime of the battery. Thus, a composite active material (hereinafter, referred to as "metal-carbon composite active material") formed of the material forming compounds with lithium and a carbonaceous material, is proposed to solve the problem as described above.

The metal-carbon composite active material can be manufactured by embedding the metals such as Sn, Al and Zn, non-metals such as Si, Ge, B and P, or oxide particles thereof in the carbonaceous material, or coating them with carbon, or embedding them in the carbonaceous material and then mixing them at a high temperature.

The anode of the lithium ion battery basically includes an active material that participates in the electrochemical reaction of the battery, a collector, and a polymer binder that binds the active materials to each other and that fixes the active material to the collector. The active material used in the anode of the lithium ion battery is a particle type active material and fixed to the collector by the binder. The particles of the active material fixed by the binder are connected to the collector by being electrically coupled to each other by point contact. Accordingly, when the degree of point contact between the active material particles is low, in other words, when the point contact area is small, the internal resistance of the battery becomes high. Isolated particles that are not connected by point contact do not contribute to the capacity of the battery. Thus, it is desirable to maintain a large contact area between the active material particles.

On the other hand, during charging or discharging of the battery, lithium ions are inserted or released from the anode structure including the active material particles. The active material particles are expanded or contracted by insertion or release of the lithium ions. The amount of expansion or contraction differs according to the kind of the material used as the active material. For example, natural graphite undergoes a change of volume of a maximum of about 10%, whereas a metal-carbon composite active material undergoes a change of volume that is significantly more than the change of the natural graphite. Accordingly, the electrical coupling between the active material particles by point contact may become unstable according to the progression of charging/discharging.

The internal resistance of the lithium ion battery is gradually increased and the capacity is gradually decreased at every charging/discharging because of the volume change and the instability of contact between the active material particles according to charging/discharging. As a result, the lifetime of the battery is shortened. The shortening of the lifetime caused by the volume change of the active material may be somewhat improved by adding a material such as carbon black as a conductive material. However, an excessive amount of conductive material causes a decrease in the proportion of the active material, thereby reducing the discharge capacity of the battery.

SUMMARY OF THE INVENTION

Aspects of the present invention provide an anode for a lithium rechargeable battery that has a large charge/discharge capacity, high charge/discharge efficiency, a flat discharge curve and excellent lifetime characteristic of charge/discharge cycle, and a lithium rechargeable battery using the same.

Additional advantages, aspects and features of the invention will be set forth in part in the description which follows and in part will become apparent to those having ordinary skill in the art upon examination of the following or may be learned from practice of the invention.

According to one embodiment of the present invention, there is provided an anode for a lithium rechargeable battery, which comprises: an active material layer including, metal-carbon composite active material comprising a carbonaceous active material and at least one active material selected from a metal or a metal oxide, graphite particles having surfaces that are coated or partially coated with a resin and a binder that binds and fixes the active material particles and the graphite particles to each other; and a collector on which the active material layer is disposed.

According to another embodiment of the present invention, there is provided a lithium rechargeable battery, comprising an electrode assembly comprising an anode, a separator and a cathode, wherein the electrode assembly comprises the anode described above.

According to another embodiment of the present invention, there is provided an anode active material layer of a lithium battery comprising a metal-carbon composite active material comprising a carbonaceous active material and at least one active material selected from the group consisting of a metal and a metal oxide, graphite particles having surfaces that are coated or partially coated with a resin, and a binder that binds and fixes the active material particles and the graphite particles to each other.

Additional aspects and/or advantages of the invention will be set forth in part in the description which follows and, in part, will be obvious from the description, or may be learned by practice of the invention.

DETAILED DESCRIPTION OF THE EMBODIMENTS

Hereinafter, the preferred embodiments of the present invention will be described in detail. The aspects and features of the present invention and methods for achieving the aspects and features will be apparent by referring to the embodiments to be described in detail. However, the present invention is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims.

According to one embodiment of the present invention, an anode for a lithium rechargeable battery comprises an active material layer that includes metal-carbon composite active material particles and graphite particles coated with resin on at least a portion of a surface thereof. The metal-carbon composite active material particles comprise a carbonaceous active material and at least one active material selected from metal or metal oxide. The active material layer further includes a binder that binds and fixes the active material particles and the graphite particles to each other. The anode further includes a collector, and the active material layer is stacked on the surface of the collector.

As a specific, non-limiting example, the metal-carbon composite active material may be a composite formed by mixing a carbonaceous material and at least one selected from Sn, Al, Si, SnO, $SnO_2$ and $SiO_2$. The discharge capacity of the metal-carbon composite active material may be within the range of 450 to 1,000 mAh/g. Methods of mixing include, for example, dispersing the metal or metal oxide in the carbonaceous material or coating the metal or metal oxide with the carbonaceous material, but is not limited thereto.

As non-limiting examples, the carbonaceous material of the metal-carbon composite active material may be amorphous carbon or crystalline carbon. For example, crystalline carbon such as natural graphite suitable for diffusion of lithium ions or synthetic graphite is desirable.

The resin-coated graphite included in the anode active material layer can function as an active material. At the same time, the resin-coated graphite can maintain a connection with the metal-carbon composite active material at many contact points due to the adhesiveness of the resin coating or due to the ability of the resin-coated graphite to slide along the outer surfaces of the metal-carbon composite. In addition, the conductivity of the resin-coated graphite is high. Therefore, due to the properties as described above, the resin-coated graphite particles can function as conduction support material between the metal-carbon composite active material particles in the active material layer, and continually keep conductive connection even if the resin-coated graphite particles are pressurized while the metal-carbon composite active material particles expand and contract during charging and discharging. Thus, the resin-coated graphite particles make it possible for the anode active material layer to resist a decrease of capacity or an increase of internal resistance caused by partial isolation of active materials in the active material layer.

As non-limiting examples, the distance between d002 layers of the graphite forming the resin-coated graphite particles may be $0.335 \pm 0.01$ nm, as measured by X ray diffraction, and an average particle diameter of the resin-coated graphite particles may be 5 to 40 μm.

As a non-limiting example, the resin-coated graphite may be mixed with the metal-carbon composite active material in the same weight and volume proportions in order to use the resin-coated graphite as a conductive material and absorbing material for the volume change during charging and discharging in the active material. However, when the resin-coated graphite is used in a relatively small amount, such as, for example, 10%, the same effects can be obtained as when a greater amount is used. Therefore, the amount of the resin-coated graphite particles may be 10 to 70 wt % of the entire active material layer.

To form the anode, an active material layer slurry is formed by mixing the metal-carbon active material and resin-coated graphite particles with a binder and a dispersion medium, coating the slurry onto a collector, then removing the dispersion medium from the slurry and rolling the anode.

In the anode, the resin-coated graphite particles contact the metal-carbon composite active material particles at many points by sliding along the surface of the metal-carbon composite active material by operation of the resin coating, and easily maintain many conductive contact surfaces due to adhesiveness of the resin. In particular, the resin-coated graphite particles are contacted with the metal-carbon composite active material particles in the anode active material layer, and are bound to the metal-carbon composite active material particles or other resin-coated graphite particles by the binder, and have many contact surfaces due to pressure of the rolling process during formation of the anode. Therefore, the resin-coated graphite particles function as intermediaries between the metal-carbon composite active material particles and have large conductive contact surfaces that contact the metal-carbon composite active material particles, thereby providing wide electron paths. Thus, a lithium rechargeable battery having a low internal resistance can be realized.

In addition, even if the volume of the metal-carbon composite active material particles is changed by charging/discharging of the battery, the resin-coated graphite particles in the active material layer act to maintain wide conductive contact surfaces by functioning as intermediaries between the metal-carbon composite active material particles. Accordingly, the multiple electron paths formed initially during the rolling process can be maintained, thereby preventing a premature shortening of the lifetime and an increase of the internal resistance of the battery.

As non-limiting Examples, the resin of the resin-coated graphite particles may be polyvinyl acetate (PVA), polyvinyl butyral (PVB), polyvinyl chloride (PVC) or carboxy methyl cellulose (CMC). When the resin coating is too thick, movement of charge carriers through the graphite particles or the intercalation of lithium ions is reduced. Therefore, it is desirable to coat the resin so as to intermittently cover the surface.

The resin may be stably attached on the surfaces of the graphite particles by preparing a powder of resin and attaching the resin powder on the surfaces of the graphite particles. Alternatively, resin in a liquid state may be mixed with the graphite particles. However, it is desirable to increase the viscosity of the resin so that the resin intermittently covers the surfaces of the graphite particles.

It is desirable to add a lithium ion containing material that is soluble in an electrolyte to the resin at the time of formation of the resin layer so as to prevent the movement of lithium ions from being interrupted by the resin coating when the active material layer is impregnated with the electrolyte.

As a non-limiting example, an SBR type polymer may be used as the binder or adhesive for binding the particles of the anode active material layer. As additional, non-limiting examples, PVDF (polyvinylidene fluoride), PVC (polyvinyl chloride), PMMA (polymethyl methacrylate), SBR latex, or PTFE (polytetrafluoroethylene) r may be used.

A material that does not easily dissolve the resin coating of the resin-coated graphite particles may be used as a volatile organic solvent to form the electrode layer slurry. Otherwise, the resin coating may be easily removed from the surfaces of graphite during the forming of the active material layer slurry, and thus the resin coating may not remain on the graphite particles to contact the metal-carbon composite active material particles in the electrode active material layer.

V as the collector of the anode plate, and not restricted by The geometrical structure and chemical composition of the collector of the anode is not limited. As non-limiting examples, various types of metal plate, metal film, metal mesh, perforated metal foil, carbon plate or carbon-coated metal may be used.

Embodiments of the present invention will be explained in detail below.

Embodiment 1

A cathode active material slurry was prepared by mixing lithium cobalt oxide ($LiCoO_2$) as an cathode active material, PVDF (polyvinylidene fluoride) as a binder, and carbon black as a conductive material in a ratio of 92:4:4 wt %, and then dispersing the mixture in NMP (N-methyl-2-pyrrolidone). A cathode was formed by coating the cathode active material slurry onto aluminum foil having thickness of 20 μm by using a coating device and drying the coated foil, and then rolling the dried, coated foil using a roll press.

Three different anodes were formed, with ratios of Si-graphite composite to resin-coated graphite of 70:30 wt %, 50:50 wt %, and 30:70 wt %, respectively. For each anode, SBR/CMC as binder/thickener was mixed in the amount of 3 wt % relative to the active material. Then, an anode slurry was prepared by dissolving and dispersing the mixture containing the Si-graphite composite, resin-coated graphite and binder/thickener in a solvent to form an aqueous slurry. Each anode was formed by coating the respective anode slurry onto copper foil having a thickness of 10 μm, drying coated foil, and then rolling the dried coated foil using a roll press. The content of Si was controlled so as to maintain the same amount of the Si-graphite composite regardless of the mixing ratio, thereby preparing an electrode plate.

An electrolytic solution having concentration of 1.15M was prepared by dissolving $LiPF_6$ in a solvent formed by mixing ethylene carbonate and dimethyl carbonate in the volume ratio of 3:7.

An electrode assembly was formed by interposing a polyolefin type separator between the prepared cathode and anode. After the electrode assembly was mounted in a case, the electrolytic solution was injected into the case. Then, the electrolytic solution injection hole was closed, thereby completing a cylindrical type lithium ion battery.

In this embodiment, CMC (carboxy methyl cellulose) was used as the resin coating of the resin-coated graphite. To form the resin-coated graphite, graphite was dispersed in a solution in which CMC was dissolved, and then thermal spraying was performed. The coating amount of CMC was 1 wt %.

Embodiment 2

Embodiment 2 was carried out in the same manner as Embodiment 1 except that PVA was used as the resin coating. The mixing ratio of Si-graphite composite to resin-coated graphite was 70:30.

Comparison Example 1

Comparison example 1 was carried out in the same manner as Embodiment 1 except that graphite without a resin coating was used in the anode.

Charge/discharge cycle tests were performed for the completed batteries of Embodiment 1, Embodiment 2 and Comparison example 1 by charging each battery with a charge current of 1 C rate, a cut-off voltage of charge of 4.2V, and discharging the battery with a discharge current of 1 C rate, a cut-off voltage of discharge of 2.7V.

Discharge capacity retention ratios after 100 cycles are shown in Table 1:

TABLE 1

|  | Si-graphite composite:graphite (wt. ratio) | Capacity retention ratio |
| --- | --- | --- |
| Embodiment 1 | 70:30 | 78% |
|  | 50:50 | 85% |
|  | 30:70 | 83% |
| Embodiment 2 | 70:30 | 77% |
| Comparison example 1 | 70:30 | 70% |

As shown in Table 1, each of the batteries of Embodiment 1 and the battery of Embodiment 2 including the resin-coated graphite particles according to aspects of the present invention showed a superior capacity retention ratio compared to the battery of Comparison Example 1. Discharge capacity retention ratio is the discharge capacity at $100^{th}$ cycle/discharge capacity at $1^{st}$ cycle.

The anode for a lithium rechargeable battery and the lithium rechargeable battery using the same according to aspects of the present invention produces the following effects.

The resin-coated graphite particles function as a conduction support material by maintaining conduction paths between the metal-carbon composite active material particles when the entire active material particles are uniformly distributed on the active material layer, thereby improving the power and charge/discharge capacity of the lithium rechargeable battery.

Further, the conductive contact points are maintained and secured between the active material particles containing the resin-coated graphite, thereby preventing degradation of the lifetime of the battery caused by repetitive charging/discharging.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An anode for a lithium rechargeable battery, comprising:
an anode active material layer; and
a collector on which the active material layer is disposed,
wherein the anode active material layer consists of
resin-coated graphite particles,
a metal-carbon composite active material, and
a binder that binds the metal-carbon composite active material and the resin-coated graphite particles together,
wherein the resin-coated graphite particles comprise graphite particles and a resin, and
wherein the metal-carbon composite active material comprises a carbonaceous active material and at least one component is selected from the group consisting of Sn, Al, Si, SnO, $SnO_2$ and $SiO_2$.

2. The anode for a lithium rechargeable battery of claim 1, wherein a distance between d002 layers of the graphite of the resin-coated graphite particles is 0.335±0.01 nm as measured by X ray diffraction and wherein an average particle diameter of the resin-coated graphite particles is 5 to 40 μm.

3. The anode for a lithium rechargeable battery of claim 1, wherein the resin is at least one selected from polyvinyl acetate (PVA), polyvinyl butyral (PVB), polyvinyl chloride (PVC) and carboxy methyl cellulose (CMC).

4. The anode for a lithium rechargeable battery of claim 1, wherein a discharge capacity of the metal-carbon composite active material is within the range of 450 to 1,000 mAh/g.

5. The anode for a lithium rechargeable battery of claim 1, wherein graphite of the resin-coated graphite particles is artificial graphite or natural graphite.

6. The anode for a lithium rechargeable battery of claim 1, wherein amount of the resin-coated graphite particles is 10 to 70 wt % of the entire active material layer.

7. A lithium rechargeable battery, comprising:
an electrode assembly comprising the anode of claim 1, a separator and a cathode.

8. The lithium rechargeable battery of claim 7, wherein a distance between d002 layers of the graphite of the resin-coated graphite particles is 0.335±0.01 nm as measured by X ray diffraction and wherein an average particle diameter of the resin-coated graphite particles is 5 to 40 μm.

9. The lithium rechargeable battery of claim 7, wherein the resin is at least one selected from polyvinyl acetate (PVA), polyvinyl butyral (PVB), polyvinyl chloride (PVC) and carboxy methyl cellulose (CMC).

10. The lithium rechargeable battery of claim 7, wherein a discharge capacity of the metal-carbon composite active material is within the range of 450 to 1,000 mAh/g.

11. The lithium rechargeable battery of claim 7, wherein graphite of the resin-coated graphite particles is artificial graphite or natural graphite.

12. The lithium rechargeable battery of claim 7, wherein amount of the resin-coated graphite particles is 10 to 70 wt % of the entire active material layer.

* * * * *